United States Patent
Abdul

[19]

[11] Patent Number: 5,180,013
[45] Date of Patent: Jan. 19, 1993

[54] METHOD FOR IN SITU REMOVAL OF A SPILLED FLUID FROM SOIL

[75] Inventor: Abdul S. Abdul, Troy, Mich.

[73] Assignee: General Motors Corporation, Detroit, Mich.

[21] Appl. No.: 758,137

[22] Filed: Sep. 12, 1991

[51] Int. Cl.⁵ .................. E21B 43/12; E21B 43/14; E21B 43/32
[52] U.S. Cl. .................................. 166/370; 166/53; 166/54.1; 166/250
[58] Field of Search .............. 166/369, 370, 371, 53, 166/54, 54.1, 250, 68.5

[56] References Cited

U.S. PATENT DOCUMENTS

| Re. 33,102 | 10/1989 | Visser et al. | 166/370 |
|---|---|---|---|
| 1,499,589 | 7/1924 | Navin | 166/265 |
| 1,530,221 | 3/1925 | Uren | 166/278 |
| 2,349,062 | 5/1944 | Uren | 166/278 |
| 2,855,047 | 10/1958 | Widmyer | 166/268 |
| 2,923,356 | 2/1960 | Glass et al. | 166/285 |
| 2,978,024 | 4/1961 | Davis | 166/278 |
| 3,057,404 | 10/1962 | Bergstrom | 166/267 |
| 3,066,732 | 12/1962 | McEver | 166/266 |
| 3,638,731 | 2/1972 | Driscoll | 166/36 |
| 3,642,066 | 2/1972 | Gill | 166/248 |
| 4,016,930 | 4/1977 | Arnold | 166/266 |
| 4,583,594 | 4/1986 | Kojicic | 166/228 |
| 4,625,807 | 12/1986 | Harlow | 166/370 |
| 4,730,672 | 3/1988 | Payne | 166/369 X |
| 4,746,423 | 5/1988 | Moyer | 210/104 |
| 4,934,458 | 6/1990 | Warburton et al. | 166/370 |

Primary Examiner—Stephen J. Novosad
Attorney, Agent, or Firm—George A. Grove

[57] ABSTRACT

In a preferred method, a spilled fluid, lighter than and immiscible with water, is removed by, first, penetrating through the fluid zone and at least partially through the groundwater zone to provide a bore in communication therewith. Then, at suitable intervals, an amount of fluid is extracted from the fluid zone through the bore at a rate selected to maintain contact between at least a portion of the fluid being extracted through the bore and at least a portion of the fluid remaining in the fluid zone. In addition, at suitable intervals, an amount of water from the groundwater zone is extracted through the bore to produce a head of fluid above the fluid/water interface adjacent the bore sufficient to cause gravity drainage of the fluid from the fluid zone in a direction generally toward the bore. Meanwhile, a major portion of the fluid/water interface and any unstressed portions of the water table are maintained at levels closely adjacent the levels occupied prior to commencing any extraction of the fluid and the water to prevent further spread of the fluid. A combination well to practice the method comprises two preferably concentric tubes, an inside tube and a shallower, larger diameter outside tube which are disposed in a well bore and hydraulically isolated from one another by sealing means. Respective suction means extract fluid and water from the respective fluid and water zones, while maintaining the fluid/water interface and any unstressed portions of the water table at about the pre-extraction position.

8 Claims, 3 Drawing Sheets

5,180,013

METHOD FOR IN SITU REMOVAL OF A SPILLED FLUID FROM SOIL

FIELD OF THE INVENTION

This invention relates to a method for in situ removal of a spilled, immiscible fluid from soil contaminated with the fluid and in particular for removal of the fluid by pumping.

BACKGROUND OF THE INVENTION

Various methods for cleaning up sites contaminated with immiscible fluids, such as solvents, gasoline, diesel fuel and oils, include partial, in situ removal of the fluid from the soil subsurface. Current methods include boring a well into the subsurface and either recovering a fraction of the spilled fluid by skimming, or pumping groundwater out from below the spilled fluid to cause some portion of the fluid to collect in previously uncontaminated regions and then pumping the fluid out. In another method, the fluid is intercepted in a trench or drain constructed at a level below the spilled fluid.

These three methods are typically ineffective, cause further spread of the contaminants through the subsurface of the soil, and result in a large portion of the fluid remaining trapped in soil and groundwater. Further, such problems are compounded in the case of a spill of viscous oil. For example, the first method could lead to isolation of the fluid from the well, rendering the well useless for further recovery of fluid from a contaminated zone. The second method induces the flow of fluid into the zone previously occupied by groundwater. This spreads the spilled fluid downward and establishes new equilibrium conditions in the region While this permits some spilled fluid to be removed, additional removal requires the sequence be repeated so that the spilled fluid is driven to deeper and more extensive regions of the subsurface. A large volume of the spilled fluid will remain trapped as residual saturation in the new regions of contamination, significantly reducing the portion able to be recovered and requiring treatment of a large volume of contaminated water.

The art of producing petroleum product from a naturally occurring petroleum reservoir formation does not provide guidance for cleaning up a spill. Natural reservoirs are under pressure, relatively impermeable at their boundary, and typically contain dissolved gases, all of which tend to induce flow of petroleum product from the reservoir. In a fluid spill, there is no natural inducement or driving force causing flow of fluid from the subsurface. The driving forces which facilitate flow from a natural reservoir are simply not present to facilitate cleaning up a contaminated spill.

In cleaning up the spill, it is desirable to prevent further spread of the spill in the subsurface and into the groundwater zone. In contrast, natural reservoir formations have low permeability at the natural boundary which deters migration of the reservoir product. Some production techniques simply include separately removing water in a relatively uncontrolled manner primarily to prevent mixing of water into the oil product and not to prevent migration of either oil or water during production.

Therefore, what is needed is a method for the recovery of a spilled fluid which is capable of removing the spilled fluid from soil in situ, while at the same time preventing the spread of the spill.

SUMMARY OF THE INVENTION

There is provided a method and an apparatus for removing a spilled fluid from soil effectively and without causing migration of the fluid to previously uncontaminated areas. The terms "fluid" and "spilled fluid" as used herein refer to a fluid which is immiscible with, and lighter than, water. Thus, the spilled fluid occupies a fluid zone overlying and displacing groundwater. The spilled fluid produces an air/fluid interface at a top surface of the spilled fluid and a fluid/water interface at a lower surface of the spilled fluid. The underlying groundwater occupies a groundwater zone displaced downward relative to the unstressed water table. The method is based upon a new understanding of the flow processes of immiscible fluids, the capillary properties of soil, the density of the spilled fluid and the thickness of the layer of fluid entrained in soil.

Basically, the method of the invention includes, first, penetrating through the fluid zone and at least partially through the groundwater zone to provide a bore in communication therewith. Then, at suitable intervals, an amount of fluid is extracted from the fluid zone through the bore at a rate selected to maintain contact between at least a portion of the fluid being extracted through the bore and at least a portion of the fluid remaining in the fluid zone. In addition, at suitable intervals, an amount of water from the groundwater zone is separately extracted through the bore to produce a head of fluid above the fluid/water interface adjacent the bore sufficient to cause gravity drainage of the fluid from the fluid zone in a direction generally toward the bore. Meanwhile, a major portion of the fluid/water interface and any unstressed portions of the water table are maintained at levels closely adjacent the levels occupied prior to commencing any extraction of the fluid and the water to prevent further spread of the fluid.

In the method of the invention, the driving force for fluid recovery is caused by the weight of the fluid column above the groundwater displaced by the spilled fluid. The method causes a head of fluid in the fluid zone above the fluid/water interface. This head is sufficient to cause gravity drainage of the fluid toward the well bore for removal through the bore.

The method provides for controlled removal of fluid to prevent displaced water, which is under stress, from rising as fluid is removed from the well. The tendency of a flow potential to cause both water and fluid to flow from the surrounding medium into the well is thus overcome. The method compensates for the fact that the rates of the flow of water and fluid are inversely related to their viscosities, the groundwater tending to replace the more viscous fluid being removed from the well, and prevents isolating the fluid from recovery. Thus, in the method, the fluid recovery rate is controlled to maximize fluid extraction while maintaining a slug of fluid in the well and thereby maintaining continuity between the slug of fluid and any remaining fluid in the fluid zone. In another aspect, the fluid/water interface is maintained at a level near its pre-extraction position.

A combination well is used to practice the method of the invention and basically consists of two preferably concentric tubes, an inside tube, and a shallower larger diameter outside tube. The tubes define an annular space therebetween. The tubes are disposed in a well bore and hydraulically isolated from one another by sealing means to prevent mixing of fluid and water carried in the respective tubes. Each tube has one end in the subsurface. open to the surrounding soil through perforated. slotted sections. The outside tube is opened to the fluid zone in the soil. The inside tube is opened to the groundwater zone below the outside tube. A suction means in the outside tube extracts or removes the fluid from the fluid zone. while another suction means in the inside tube extracts or removes groundwater adjacent the tube and from below the fluid zone layer to maintain the fluid/water interface and any unstressed portions of the water table at about the pre-extraction position, while enhancing the flow of the fluid into the outside tube.

Preferably, the step of extracting the fluid by suction means includes exerting suction at a top surface of the fluid in the bore, and the step of extracting the water by suction means includes exerting suction at a location below the top surface of the water and sufficiently spaced from the fluid/water interface to minimize mixing of fluid into the water. Preferably, the suction means is a pump with respective suction and discharge ends.

Preferably, level adjustment means senses movement of the fluid/water interface and adjusts the suction end of one pump to a position below the fluid/water interface. Preferably, a head or column of fluid is regulated by a sensor or transducer which floats on the fluid/water interface and is set to provide a head or height of fluid above the interface in the bore to provide continuity of fluid in the bore with fluid in the surrounding soil of the fluid zone.

Preferably, one or more additional level adjustment and control means automatically control the interval and/or rate of groundwater extraction to maintain the depressed fluid/water interface at about its pre-pumped position and adjust the suction end of the water pump to a level below the fluid/water interface.

Thus, advantageously, the method provides the driving forces needed to induce flow of a spilled fluid toward the well bore for subsequent removal without such driving forces causing undesired side effects such as spread of the contamination plume, adverse effect on area water systems and the like.

These and other objects, features and advantages will become apparent in the following description of the preferred embodiments, appended claims and accompanying drawings.

DETAILED DESCRIPTION OF THE PREFERRED EMBODIMENTS

Figure 1:
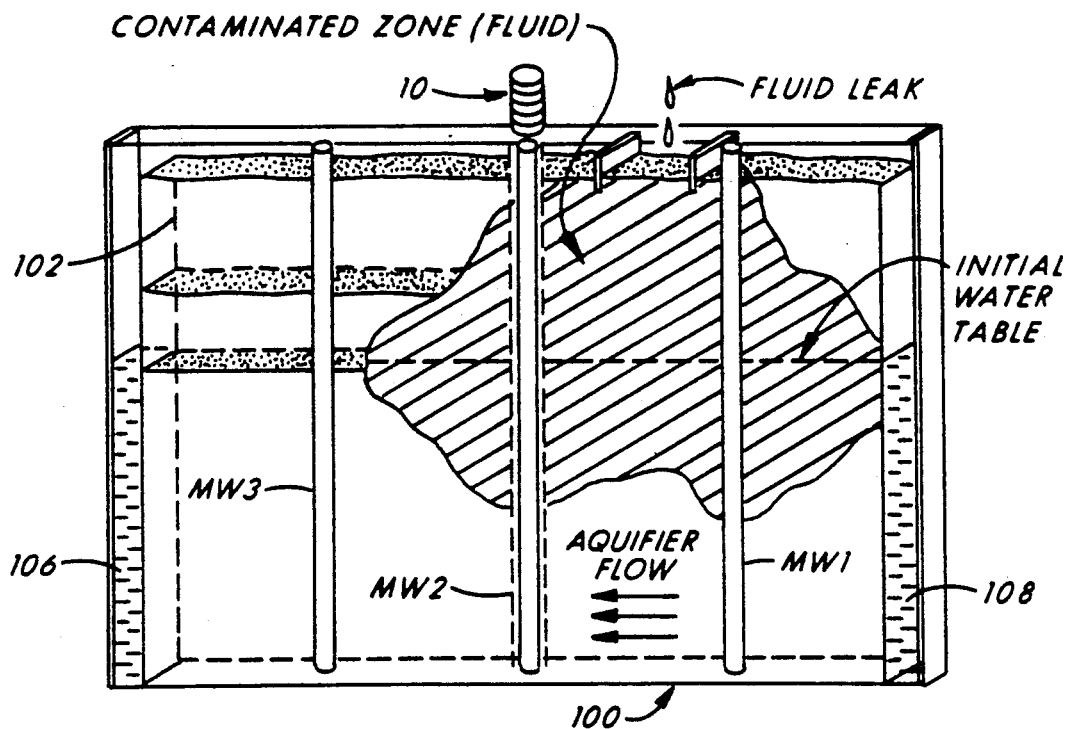
FIG. 1 is a laboratory model simulating typical subsurface soil and groundwater conditions.

FIG. 1 illustrates a laboratory model 100 constructed to simulate actual field conditions existing at a spill site. Soil samples from a field site were used to construct the laboratory model as shown in FIG. 1.

Figure 2:
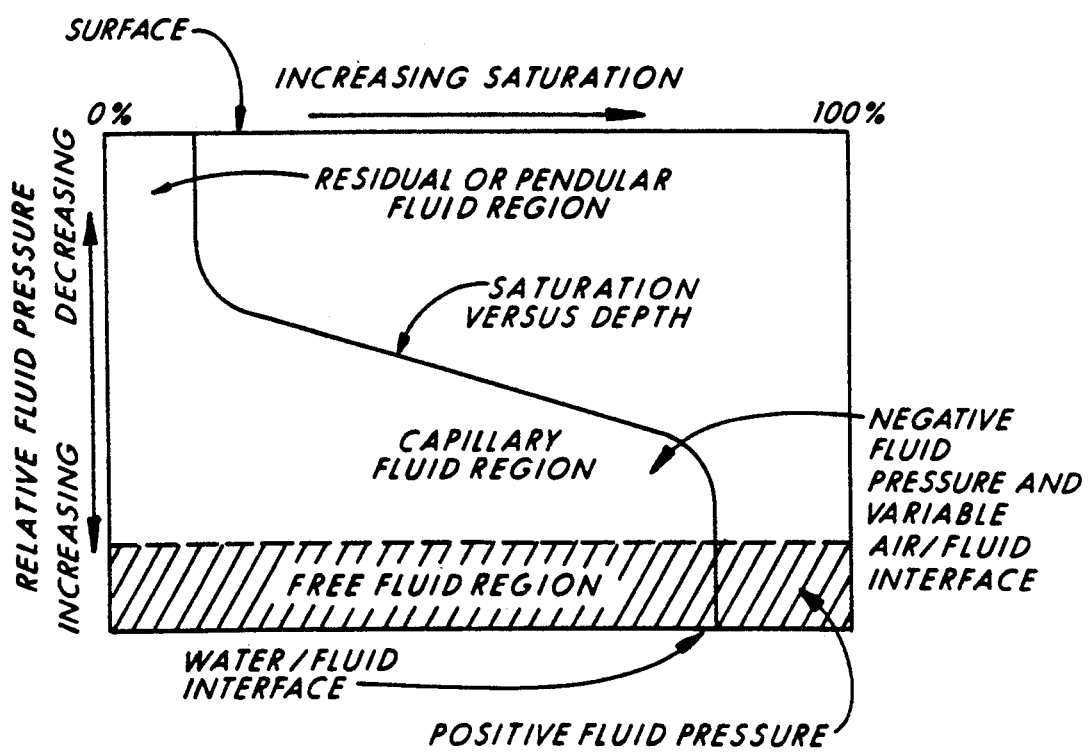
FIG. 2 is a diagram showing subsurface zones produced by the spill of a fluid.

In the model 100, a fluid leak is shown causing contamination in the soil subsurface. The terms "fluid" and "spilled fluid" as used herein refer to a fluid which is immiscible in, and lighter than, water. The contaminated soil is illustrated by cross-hatching. This contaminated zone, referred to herein as a "fluid zone", may be thought of as having three distinct regions (FIG. 2): a) free fluid region; b) region of fringe or capillary held fluid; and c) region of residual or pendular held fluid. A diagram of the various regions is shown in FIG. 2.

In the free fluid region, the soil is about 80 percent saturated with fluid which has depressed the water table and is induced to flow under a head. The fluid in the capillary held region is induced to flow, provided sufficient height of fluid (head) is created. Some portion of the capillary held fluid may thus also be induced to flow.

Figure 4:
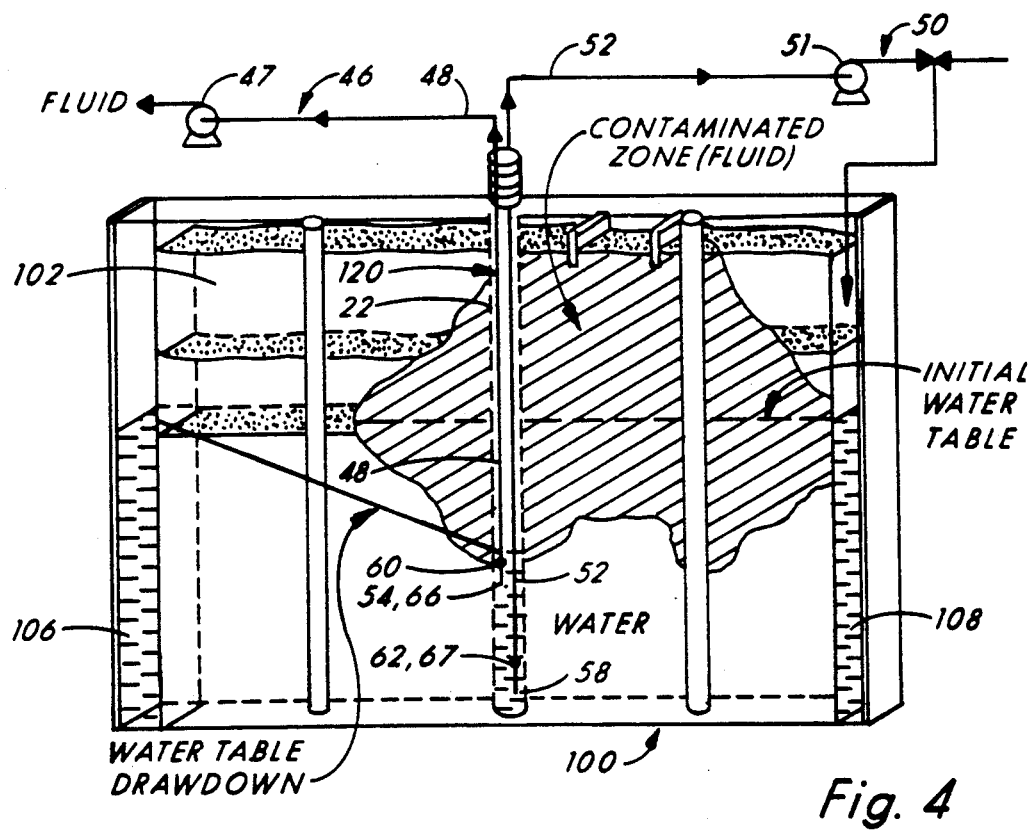
FIG. 4 is the lab model of FIG. 1 and including the apparatus of FIG. 3.

The method of the invention is based upon new understanding of the three regions and of the fluid and water distribution, retention and flow properties. Basically, the method involves the removal of free fluid from a well 10 at a rate that maintains a slug of fluid in the well which is continuous with the free fluid region in the adjacent porous subsurface. As the fluid/water interface in the well starts to rise when fluid is removed from the well, water is extracted from the groundwater zone at a rate only sufficient to maintain the fluid/water interface in the well and subsurface at about its original position. While this approach creates a zone of influence or a gradient for the fluid flow to the well, it also restricts the development of a deep-drawdown cone and the further vertical spread of the spilled fluid. One or more monitoring wells (MW) are used to detect the levels of fluid, water and the fluid/water interface (FIGS. 1 and 4).

Accordingly, the invention provides a method for extracting a spilled fluid from soil, the fluid being immiscible with, and lighter than, water, occupying a fluid zone overlying groundwater, and producing air/fluid and fluid/water interfaces, with the underlying water occupying a groundwater zone displaced downward relative to an unstressed water table. The invention comprises, first, penetrating through the fluid zone and at least partially through the groundwater zone to provide a bore in communication therewith. Then, at suitable intervals, an amount of fluid is extracted from the fluid zone through the bore, at a rate selected to maintain contact between at least a portion of the fluid being extracted through the bore and at least a portion of the fluid remaining in the fluid zone. In addition, at suitable intervals, an amount of water from the groundwater zone is separately extracted through the bore to produce a head of fluid above the fluid/water interface adjacent the bore sufficient to cause gravity drainage of the fluid from the fluid zone in a direction generally toward the bore. Meanwhile, a major portion of the fluid/water interface and any unstressed portions of the water table are maintained at levels closely adjacent the levels occupied prior to commencing any extraction of the fluid and the water, to prevent further spread of the fluid.

Thus, in the method, the fluid recovery rate is controlled to maximize fluid extraction while maintaining a slug of fluid in the well so as to maintain continuity between the slug of fluid and any remaining fluid in the fluid zone in the subsurface. In another aspect, the fluid/water interface is maintained at a level near its pre-extraction position.

The performance of the method was evaluated in the laboratory (FIGS. 1 and 4) by simulating actual field conditions. It was also evaluated on a confidential and restricted basis at a field site, using a combination well 10, as described below.

Figure 3:
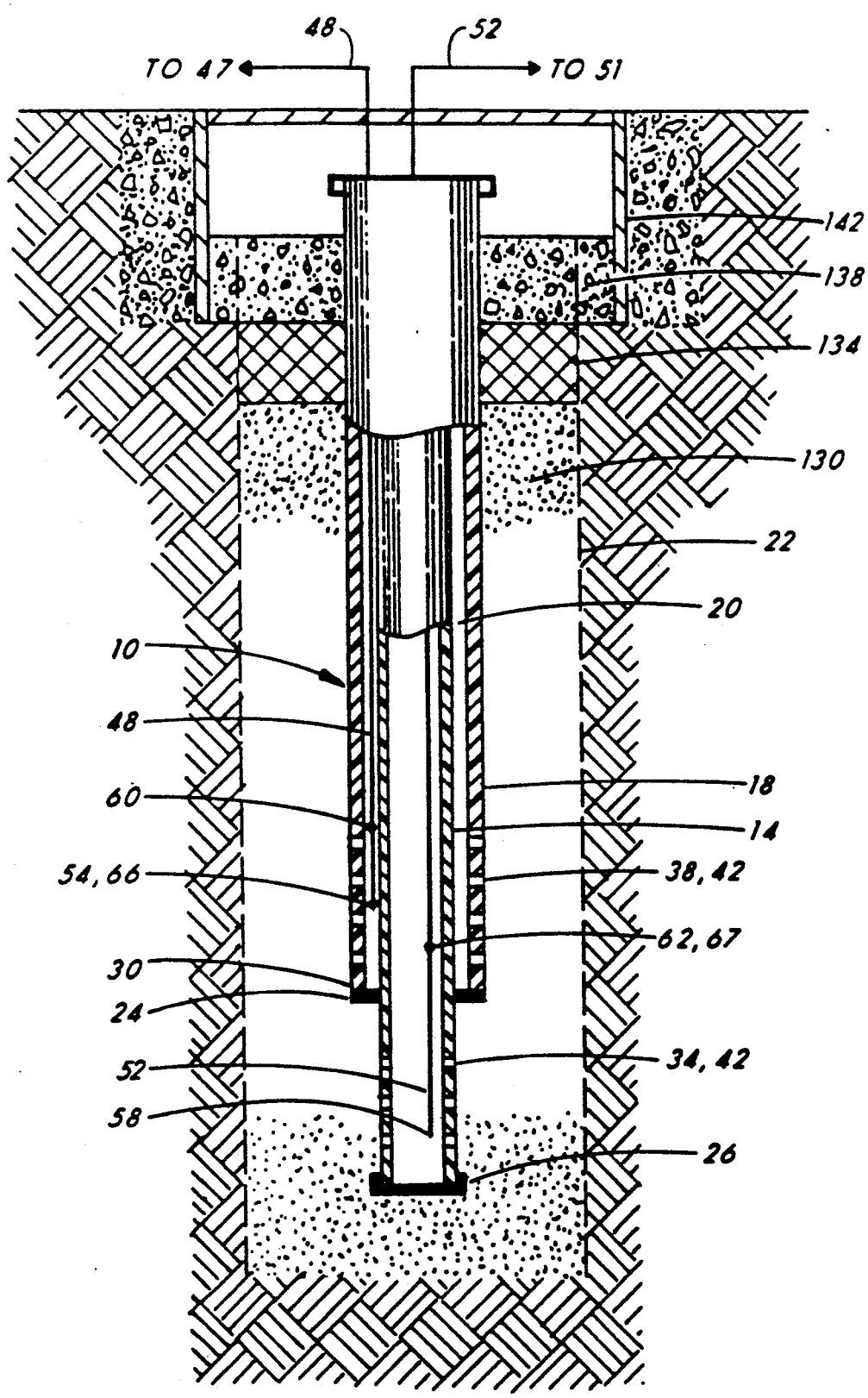
FIG. 3 is a schematic view, partially in section, of the apparatus of the invention and showing the arrangement of the apparatus in the subsurface.

The combination well 10, used to practice the method of the invention, basically consists of two preferably concentric tubes, an inside tube 14 and a shallower larger diameter outside tube 18 (FIG. 3). The tubes 14, 18 define an annular space 20 therebetween. The tubes 14, 18 are disposed in a well bore 22 and hydraulically isolated from one another by sealing means 24 to prevent mixing of fluid and water carried in the respective tubes. Each tube 14, 18 has, respectively, one distal end 26, 30 in the subsurface and open to the surrounding soil through perforated or slotted sections 34 of tube 14 and 38 of tube 18. The perforated sections 34, 38 each preferably consist of parallel 0.01 inch slots 42. By way of example, at a field site, the outside tube 18 may be opened to the soil from two feet above the position of the unstressed water table to four feet below the water table through a zone of fluid contaminated soil. Further, by way of example, the inside tube 14 may be opened to the next two feet of the groundwater zone below the outside tube 18. A suction means 46 is used to recover the fluid from the fluid zone through tube 18, while another suction means 50 is used to extract groundwater from below the fluid zone layer through tube 14 to maintain the fluid/water interface and any unstressed portions of the water table at about the pre-extraction position. Preferably, each suction means 46 is a pump 47 with tubing 48 extending therefrom with a suction end 54. Similarly, suction means 50 is a pump 51 with tubing 52 extending therefrom with a suction end 58 (FIGS. 3 and 4).

Preferably, the step of extracting the fluid by pumping includes exerting suction or a partial vacuum adjacent a top surface of the fluid in the bore, and the step of extracting the water by pumping includes exerting suction or a partial vacuum at a location below the top surface of the water and sufficiently spaced from the fluid/water interface to minimize mixing of fluid and water.

Desirably, first level adjustment means 60 causes suction end 54 of suction means 46 in tube 18 to remain at a level at or just below the air/fluid interface in the annular space 20. Preferably, adjustment means 60 is carried on tube 48 adjacent end 54 of tube 48. A second level adjustment means 62 is used to sense movement of the fluid/water interface in the bore 22 and to adjust the suction end 58 of suction means 50 in tube 14 to a position below the fluid/water interface. Preferably, adjustment means 62 is carried on tube 52 adjacent end 58 of tube 52.

Preferably, the head or column of fluid is regulated by a sensor 66 which is a transducer which floats on the fluid/water interface and is set to regulate pumping of fluid to provide a head or height of fluid above the interface in the bore 22, to thereby maintain continuity of fluid in the bore 22 with fluid in the surrounding soil of the fluid zone.

Preferably, control means 67 regulates the cycle and/or rate of water pumping to maintain the depressed fluid/water interface at about its pre-pump position. Control means 67 may be located in a monitoring well (MW) adjacent the combination recovery well 10.

EXAMPLE 1

As shown in FIGS. 1 and 4, a laboratory model 100 was made of Plexiglas and supported from the outside by an iron frame and an aluminum base. The model was 5.91 feet long, 4.59 feet high and 0.33 feet wide. The model was packed with clean sand 102 that was air-dried and sieved through a 0.02 inch standard mesh to represent sandy material found at field sites. To construct a realistic porous medium, the sand was poured into the model in increments of 0.33 inch thick layers, and each new layer was mixed with the previous layer by using an electric blender equipped with an extended shaft. The sand medium in the model aquifer was 5.51 feet long, 4.17 feet high and 0.33 feet wide.

One face of the model aquifer was instrumented with 26 tensiometers (not shown) for measuring water and fluid pressures in the porous subsurface medium. On each end of the sandy medium 102 was a 2.36 inch wide boundary reservoir 106, 108. These two reservoirs 106, 108 were connected at the base by a 0.49 inch ID tube (not shown) which was used to maintain constant head conditions on the sides of the medium 102. The initial water table was maintained between 29.53 and 33.46 inches (75 and 85 cm) above the base of the model aquifer, and the capillary fringe extended about 7.87 inches (20 cm) above the water table.

Three 1.0 inch ID monitoring wells (MW1, MW2 and MW3) were installed through the medium 102, and their locations are shown in FIG. 1. These wells were first machined into longitudinal halves, and the rectangular side of each half tube was attached to the inside surface of the Plexiglas-model aquifer. By this design, it was possible to visually observe the thickness of fluids in the monitoring wells (MW1, MW2, MW3).

In order to compare performance of the lab model 100 to expected performance based upon new understanding of the fluid/water and system properties, saturation pressure relationships for water, fluid and the sand were determined in standard funnel experiments. From the experiments, the vertical extent of the capillary fringe under conditions of drainage was 12.99 inches for water and 7.09 inches for fluid, and for wetting conditions was 5.91 inches and 3.15 inches for water and fluid, respectively. The hydraulic conductivity (Ks) of the sand was measured in column tests using standard falling- and constant-head techniques, and it was also measured in situ by performing a constant-rate pumping test of the model aquifer. The values for Ks from the column tests ranged from 0.047 to 0.118 inch/min, while Ks from pumping tests ranged from 0.0045 to 0.0090 inch/min. The porosity of the medium was about 0.40, and the particle density was 2.55 g/mL. Groundwater flow was maintained at 0.061 $inch^3$/min (1 mL/min) in the direction shown in FIG. 1. This resulted in an average linear pore-water velocity of 0.078 inch/min.

A total of 3.04 gallons (11.5L) of fluid was leaked to the surface of the sand, at the location shown in FIG. 1, at an average rate of 0.392 gallons/day for 7.75 days. The fluid used in this example was oil with a viscosity of about 7 centistokes at 100° C. The fluid spread laterally and vertically through the unsaturated region and the capillary fringe, and it subsequently developed a layer of free fluid in the capillary fringe. As the thickness of the layer of free fluid increased and the pressure in the oil layer progressively exceeded the pressure in the surrounding water by the value of the capillary pressure across the fluid/water interface, the fluid/water interface was displaced progressively deeper into the groundwater zone. During this vertical displacement, the fluid was also spreading laterally through the capillary fringe. These experimental observations of fluid (oil) spread were found to be consistent with observations of the spreading process at an actual field site.

When the distribution of fluid through the system was no longer changing significantly, the fluid had spread through about 33 percent (2.50 cubic feet) of the model aquifer and had formed a 4.27 feet long by 0.26 feet thick layer of free fluid. On the average, the volume of fluid in the free fluid region was the same as that in the fluid fringe region (0.98 gallons). Of the remaining 1.08 gallons of fluid, about 0.13 gallons was accumulated in the wells and 0.95 gallons was held in the capillary and pendular regions. This gives an average fluid saturation in the capillary and pendular regions of 24 percent, which compares favorably with the range of residual saturation (20 to 35 percent) measured in prior funnel experiments.

By calculations, it was estimated that of the 1.96 gallons of fluid in the free fluid region and the fluid fringe region, about 1.37 gallons could be drained and recovered by pumping, assuming that the remaining 0.59 gallons (30 percent) would be held in the soil pores as residual retention. The evaluation of the recovery system was based on the extent of removal of the 1.37 gallons of drainable fluid from the free fluid region and the fluid fringe region.

The recovery well 120 in the model aquifer system 100 was constructed and arranged in accordance with the combination well 10 described above. Level adjustment means 60 comprised a ping-pong ball through which tube 48 extended such that the suction end 54 was exerted at just below the air/fluid interface in the bore 22. The rate of fluid removal was controlled to maintain a slug or column of fluid in the well bore 22. The lower one inch section of the water-recovery tube 48 was screened to ascertain that water was pumped from the base of the bore 22. The water pumping rate was gradually increased over the first five days of fluid recovery, after which the rate was kept at about 350 mL/min (0.092 gallons/min) to maintain the fluid/water interface at approximately 1.80 feet above the base of the model aquifer. This level approximated the pre-pumped position of the fluid/water interface in the medium at monitoring well MW2 of FIG. 1. The water that was pumped from the recovery well was returned to one boundary well, which was directly connected to the boundary well at the opposite end of the model, to maintain the same constant head condition at both ends of the model aquifer. Make-up water was also added to the boundary well to account for evaporative losses and for any water removed with the fluid by the fluid-recovery pump. The fluid-recovery system was stopped after 31 days of pumping because, at that time, more than 99.9 percent of the fluid being pumped from the fluid-recovery tube was water.

Figure 5:
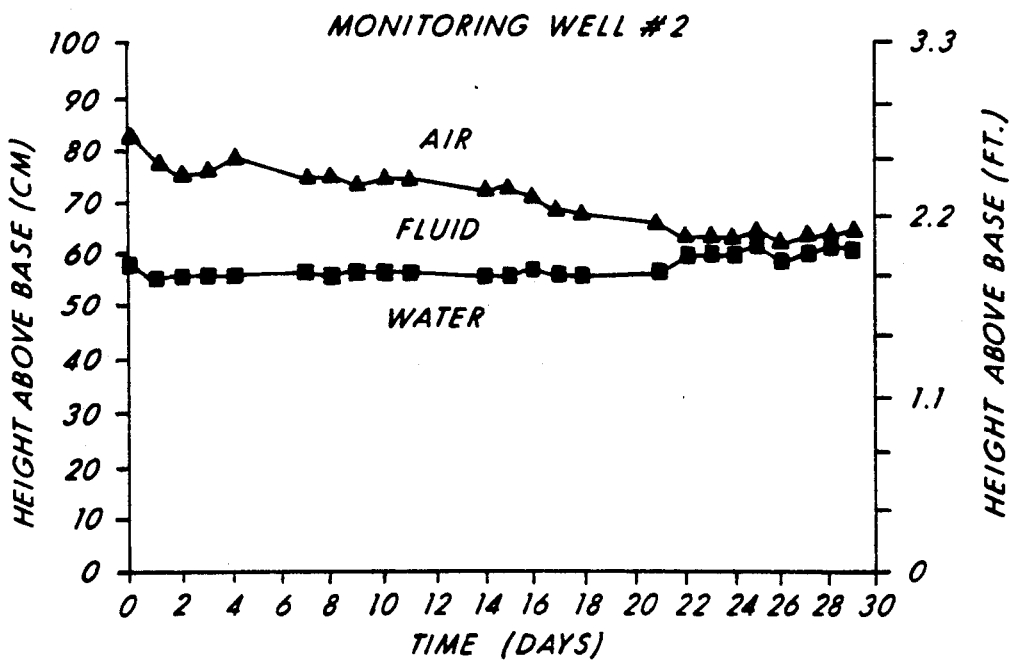
FIG. 5 is a chart showing reduction in the fluid zone and movement of air/fluid and fluid/water interfaces as fluid is removed from the subsurface.

Results from MW2 are presented in FIG. 5, which shows an initial drop in the fluid/water interface as pumping started, after which the interface was maintained at an almost constant level of about 1.80 feet above the base of the model aquifer for the next 19 days. Then, the interface rose to 2.03 feet, where it remained until the end of the study. The sudden rise in the interface occurred after standing fluid in the monitoring well was pumped out. The standing fluid in the monitoring wells was removed at least once every week to ascertain that the fluid in each monitoring well was hydraulically connected to fluid in the medium. After the fluid was removed on day 22, it recovered only slightly, indicating that the free fluid was already pumped out.

At the start of pumping, about 0.13 gallons (500 mL) of fluid was in the two inch ID recovery well 120, which accounts for the initial high recovery rate followed by the rapid decrease in recovery rate as that volume was being depleted. During the first few days of pumping, the effluent from the fluid-recovery tube 18 was almost 100 percent fluid; however, as pumping continued, the recovered fluid first contained dispersed water in the fluid and then contained slugs of water separated by slugs of fluid. After 19 days of pumping, there was more water than fluid in the fluid pumped from the product tube and, by the end of the test, only trace levels of fluid were being recovered. The cumulative fluid recovered from the model aquifer increased steadily during the 31 days of pumping, by which time 1.71 gallons of fluid were pumped out.

Intermittent recovery from the well for another 30 days recovered another 0.14 gallons of fluid, giving a total volume of recovered fluid of 1.84 gallons or 61 percent of the original spilled fluid volume. The actual amount of fluid recovered exceeded the predicted volume by 0.33 gallons and demonstrated that the recovery system performed effectively. Thus, the results demonstrate that this new pumping strategy successfully recovered most of the drainable fluid from this model aquifer. The laboratory model was validated by nearly identical performance of the method as evaluated at a field site.

EXAMPLE 2

Five fluid-recovery systems were installed at a 64,000 square foot field site where 200,000 gallons of fluid (viscous oil as described in Example 1) had been spilled. The plume created by the spill occupied a volume defined by a depth of 11 feet and a maximum peripheral extent of about 250 feet. Each system included a combination recovery well 10 (FIG. 3) in a bore 22 and a monitoring well MW, located within a radius of 10 feet of the combination well 10. Each combination well 10 included two concentric tubes 14, 18 with respective pneumatic pumps: a fluid recovery pump 47 and a groundwater pump 51. Uncontaminated sand 130 was packed between the peripheral surface of the bore 22 and the outside of the tubes 14, 18. The sand 130 was capped with clay 134 and then concrete 138 and capped with a cover 142. Fluid or water pumping at each recovery location was independently and automatically controlled to maintain preselected pumping conditions. The data acquired from the five recovery systems revealed trends essentially identical to the trends described above for the lab model in Example 1.

Typically, the outer tube 18 was opened to the subsurface medium from two feet above the position of the unstressed water table to four feet below the water table (through the free fluid region), while the inner tube 14 was opened to the next two feet of the groundwater zone below the outer tube 18. The pump 47 in the outer tube 18 recovered fluid from just below the air/fluid interface, while the pump 51 in the inner tube 14 pumped groundwater from below the fluid/water interface. Pumping conditions were modified to maintain the fluid/water interface at its pre-pumping position and to maintain continuity of the fluid in the fluid zone of the medium with the fluid column in the recovery well 10. The on/off cycles of the pumps 47, 51 were automatically controlled by presetting their refill and discharge times. In addition, the on/off cycle of the water pump 51 was controlled by a down-well bubbler control 67. A two inch ID monitoring well MW was installed within 10 feet of each combination well 10 to provide information on the response of the fluid/water interface and on fluid thickness adjacent to the combination well 10 during pumping.

During the first two weeks of pumping at the field site, the system was frequently monitored and the pumping rates of fluid and water adjusted to establish the maximum fluid-pumping rate, to maintain a slug of fluid in the fluid recovery tube 18, and to maintain the fluid/water interface in the groundwater zone at its pre-pumped position. Subsequently, as understanding of the system response improved and that response became more predictable, the monitoring interval was increased to one week, then to two weeks, and then to one month, and finally to bimonthly.

Although there were variations in control and operating conditions at each of the five combination wells 10, the trends and results observed in the five monitoring wells MWA adjacent to each combination well 10 were similar over the duration of pumping and corresponded to the lab model 100. The conditions at each well 10 will dictate whether fluid or water pumping should be initiated first. For example, if the bore extends through a relatively depressed portion of the groundwater zone, fluid pumping may be initiated before water pumping.

The results showed that when the drawdown in the combination well 10 was maintained at a depth of about 10 feet below the surface, corresponding to the depth of the fluid/water interface in the region of the centroid of the fluid contamination plume, the zone of influence of the recovery well was more than 100 feet after 10 days of pumping.

The field results indicated that the fluid in the subsurface medium was always in direct hydraulic connection with the slug of fluid in the fluid recovery tube 18; therefore, fluid isolation was avoided. Further, the almost constant position of the fluid/water interface in the bore 22 suggests that fluid was not drawn deep into the groundwater zone during pumping.

During a period of 770 days, a total of about 5,697 gallons (210,813 liters) of fluid was pumped from the five combination wells 10 at an average rate of about 8.7 gallons/hour (550 mL/min). The volume of fluid recovered from the five respective combination wells 10 was 14,688; 15,017; 4,944; 14,787 and 6,259 gallons.

While the approach used in this study maintained a steady flow of fluid to the combination recovery well 10, it also restricted the fluid to the region of the soil and groundwater system that was already contaminated.

In both the lab and field site examples, both the vertical and horizontal extent of the contamination plume was significantly reduced. In both examples, after some period of pumping, the thickness of fluid in the recovery well was very small. At this stage of the recovery process, not only was fluid from the free-fluid region pumped out, but also fluid from the fluid fringe region was being drained and recovered. When the thickness of the free fluid region of the contaminated fluid zone reached zero, the fluid thickness in the monitoring well MW was determined only by capillary forces and fluid densities.

The good performance of the fluid recovery system was undoubtedly dependent on the new approach taken in this study. By maintaining the water table drawdown at the initial position of the fluid/water interface, further spread of the fluid into the groundwater zone and reduction of the recoverable volume of fluid were minimized. In addition, by maintaining a slug or column of fluid in the combination well 10 in contact with the fluid layer in the porous medium, the fluid flow to the well was maintained during pumping, and the residual volume of fluid remaining trapped in the porous subsurface medium was minimized.

Although not wishing to be limited to any particular theory, it is believed the following theoretical explanation applies.

The ratio of the fluid thickness in the well bore to that in the adjacent porous medium under hydrostatic conditions is described by the following equations:

$$H_c = p^o a / [(d_o - d_a)g] \quad (1)$$

$$H_w = p^w o / [(d_w - do)g] \quad (2)$$

$$H_w / H_c = (p^w o / p^o a)[(d_o - d_a)/(d_w - d_o)] \quad (3)$$

where,
$H_c$ = thickness of the fluid capillary fringe
$H_w$ = thickness of the fluid column in the well
p = capillary pressure
d = density
g = gravitational constant
a,o,w = air, oil, and water, respectively In the lab example (Example 1), for $p^w o = p^o a$, $d_o = 0.869$, and $H_c = 0.26$ feet, the expected thickness of the fluid in the well, when the fluid fringe is fully developed, is very thin (i.e., about 1.73 feet). This thickness is smaller than the maximum values observed in the monitoring wells during accumulation of the fluid in the groundwater zone, but is larger than the values in MW1 (0.81 feet) and MW2 (1.30 feet) just prior to the start of pumping. The average thickness of the free fluid region in the model aquifer was determined by using an ultraviolet "black light" source to locate the area of highest saturation and by using the fluid manometers to locate the area of that region where the fluid pressure was higher than atmospheric pressure. By both the theoretical calculation and visual observations during the study, most of the drainable fluid was recovered by the end of the study.

The calculated volumes also compared favorably to observed values in the case of the field site (Example 2), which follow below.

The thickness of the vertical column of fluid in the monitoring wells at the field site (Example 2) was measured 700 days after the start of pumping and was used to calculate the corresponding thickness ($H_m$) of fluid in the contiguous porous subsurface medium. The following equations were used in the calculation:

$$H_m = H_w - H_c \quad (4)$$

$$H^c = p^w o / \{(d_w - d_o)g\} \quad (5)$$

where $H_e$ is the thickness of fluid in the well bore below the base of the free fluid (fluid saturated) region, and the other parameters are as previously defined. The fluid/water capillary pressure was previously measured in laboratory experiments, and an average value of 6.43 cm fluid (2.53 inches of air/fluid) was used in the calculations, while a measured value of 0.869 g/cm$^3$ (54 lb/ft$^3$) was used for the specific gravity of fluid.

The calculated values of fluid thickness in the porous medium were mapped. Then using linear interpolation, contours of equal thicknesses were drawn. The volume of fluid between two contours is equal to the area between the contours, times the average thickness of the fluid layer within the two contours, and adjusted for the fraction of the pore volume occupied by fluid. The fraction of the pore volume occupied by fluid is the porosity ($\epsilon$) minus the fraction of the total volume occupied by residual levels of water ($\theta_rw$). This calculation for the total volume of fluid in the zone of fluid is described by the following relationship:

$$V = (\epsilon - \theta_r w) \Sigma i (A_i \cdot h_m i) \quad (6)$$

where, $A_i$ is the area between two adjacent contour lines and $h_m i$ is the average fluid thickness for the two contour lines. For measured values of $\epsilon = 0.4$ and $\theta_r w = 0.007$, the volume of free fluid remaining in the subsurface is approximately 87,000 gallons. Before the start of pumping, the volume of fluid in the zone of free fluid was 133,000 gallons. Based on these calculations, about 46,000 gallons of fluid was recovered, which compares favorably with the measured recovered volume of about 55,700 gallons.

In the laboratory model, calculated and observed values showed that 61 percent of the spilled fluid was removed by the method of the invention. At the field site, which was more complex and obviously more extensive, more than 42 percent of the estimated spilled fluid in the free fluid region was recovered, and overall 27 percent of the total volume was recovered.

Thus, advantageously, the invention prevents the flow of water into the fluid zone, thereby preventing isolation of fluid from the well bore (water mounding); controls the fluid/water interface to maintain a gradient for fluid flow toward the well bore; minimizes the spread of contamination; minimizes the volume of water removed from the soil during the process, thus reducing the amount of water needed to be treated; creates a zone of influence or gradient for fluid flow to the well (bore); and provides for automatic control by the use of sensor level and control means which detect movement of fluid and water and thereby provide through an integrated control system necessary adjustments to the pumping intervals, rates and extracted volumes.

Advantageously, the recovery method of the invention may be used with surfactant and microbial based clean-up techniques. As a result, a spill site is restored to virtually its original condition without disturbance of subsurface medium and groundwater.

While this invention has been disclosed principally in terms of a particular embodiment, it is not intended to be limited to that embodiment, but rather only to the extent set forth in the following claims.

The embodiments of the invention in which an exclusive property or privilege is claimed are defined as follows:

1. A method for extracting a spilled fluid from soil, the fluid being immiscible with and lighter than water and occupying a fluid zone overlying groundwater, thus producing air/fluid and fluid/water interfaces, the underlying water occupying a groundwater zone displaced vertically downward by the fluid relative to an unstressed water table, comprising:

penetrating through the fluid zone and at least partially through the groundwater zone to provide a bore in communication therewith; and then extracting an amount of fluid from the fluid zone through the bore, the amount selected to maintain contact between at least a portion of the fluid being extracted through the bore and at least a portion of the fluid remaining in the fluid zone; and separately extracting an amount of water from the groundwater zone through the bore to minimize upward movement of water from the groundwater zone into the fluid zone and to provide or at least maintain a head of fluid above the fluid/water interface adjacent the bore sufficient to cause gravity drainage of the fluid from the fluid zone in a direction generally toward the bore and controlling extraction of the water from the groundwater zone in a manner selected to maintain a major portion of the fluid/water interface and any unstressed portions of the water table at levels closely adjacent the levels occupied prior to commencing any extraction of the fluid and the water to prevent or at least minimize further vertical spread of the fluid.

2. A method according to claim 1 further including:
penetrating through the fluid zone and at least partially through the groundwater zone adjacent the bore to thereby provide a monitoring well; and detecting the level of at least one of the fluid, the water and the fluid/water interface in the monitoring well and then selecting the amounts based upon the detected level.

3. A method according to claim 1 wherein the step of extracting the fluid includes exerting suction at a top surface of the fluid in the bore.

4. A method according to claim 1 wherein the step of extracting the water includes exerting suction below the fluid/water interface so as to minimize mixing of the fluid into the water being extracted.

5. A method for extracting a spilled fluid from soil, the fluid being immiscible with and lighter than water and occupying a fluid zone overlying groundwater and producing air/fluid and fluid/water interfaces, the underlying groundwater occupying a groundwater zone displaced vertically downward by the fluid relative to an unstressed water table comprising:

penetrating through the fluid zone and at least partially through the groundwater zone to provide a bore in communication therewith, and permitting fluid from the fluid zone to accumulate in the bore in an amount sufficient to establish a slug of fluid in the bore in contact with at least a portion of the fluid remaining in the fluid zone, the slug having a top end in contact with air at an air/fluid interface and a bottom end in contact with water at a fluid/water interface;

extracting an amount of fluid from the fluid zone through the bore, the amount selected to maintain the slug in contact with any of the fluid remaining in the fluid zone; and separately extracting an amount of water from the groundwater zone through the bore to minimize upward movement of water from the groundwater zone into the fluid zone and to produce a lowering of the bottom end of the slug sufficient to cause gravity drainage of the fluid from the fluid zone in a direction generally toward the bore and controlling extraction of the water from the groundwater zone in a manner selected to maintain a major portion of the fluid/water interface and any unstressed portions of the water table at levels closely adjacent the levels occupied prior to commencing any extraction of the fluid and the water to prevent formation of a deep-drawdown cone.

6. A method according to claim 5 further including:
penetrating through the fluid zone and at least partially through the groundwater zone adjacent the bore to thereby provide a monitoring well; and
detecting the level of at least one of the fluid, the water and the fluid/water interface in the monitoring well and then selecting the amounts based upon the detected level.

7. An apparatus for use in removing a spilled fluid from a subsurface of soil through a well bore having an upper end exposed to a top surface of the soil and a distal lower end disposed in the subsurface, the fluid being immiscible with and lighter than water and occupying a fluid zone overlying groundwater, thus producing air/fluid and fluid/water interfaces, the underlying water occupying a groundwater zone displaced downward relative to an unstressed water table, comprising:
a first tube disposed in the bore and a second tube longer than the first tube with a diameter less than the diameter of the first tube, each tube having respective upper ends exposed to the top surface and distal lower ends disposed in the bore, the second tube encompassed by the first tube from the upper ends of each of the tubes to intermediate of the second tube, thereby defining an annular space between the first and second tubes;
sealing means disposed at the lower end of the first tube and intermediate of the second tube and constructed and arranged to isolate the annular space from an interior of the second tube;
perforations in the first tube above the sealing means and below the upper end of the first tube;
perforations in the second tube below the sealing means and above the lower end of the second tube;
first suction means in the first tube constructed and arranged to extract fluid from the annular space;
second suction means in the second tube constructed and arranged to extract water from the interior of the second tube;
first level adjustment means constructed and arranged to cause the first suction means to remain on or just below the air/fluid interface;
second level adjustment means constructed and arranged to cause the second suction means to remain at a level below the fluid/water interface;
first sensor means constructed and arranged to detect a head of fluid above the fluid/water interface and to activate the first suction means when the head is greater than or equal to a predetermined value; and
control means constructed and arranged to activate the second suction means so as to maintain the fluid/water interface at a desired level.

8. An apparatus according to claim 7 further including a monitoring well disposed adjacent the first tube, the monitoring well including second sensor means constructed and arranged to sense movement of the air/fluid and fluid/water interfaces.

* * * * *